United States Patent
Kucza et al.

(10) Patent No.: US 6,764,558 B2
(45) Date of Patent: Jul. 20, 2004

(54) ALUMINUM ALLOY STRIP MANUFACTURING PROCESS FOR THE MANUFACTURE OF BRAZED HEAT EXCHANGERS

(75) Inventors: Jean-Claude Kucza, de Crossey (FR); Sylvain Henry, Voiron (FR); Michel Mediouni, Moirans (FR); David Ebersolt, Colmar (FR); Nathalie Remond, Colmar (FR)

(73) Assignee: Pechiney Rhenalu (FR)

( * ) Notice: Subject to any disclaimer, the term of this patent is extended or adjusted under 35 U.S.C. 154(b) by 0 days.

(21) Appl. No.: 09/987,699

(22) Filed: Nov. 15, 2001

(65) Prior Publication Data

US 2002/0056492 A1 May 16, 2002

(51) Int. Cl.$^7$ ................................................. C22F 1/04
(52) U.S. Cl. ......................... 148/523; 148/528; 148/535
(58) Field of Search ................................ 148/523, 528, 148/535, 551

(56) References Cited

U.S. PATENT DOCUMENTS

| | | | | |
|---|---|---|---|---|
| 4,082,578 A | * | 4/1978 | Evancho et al. | 148/535 |
| 4,517,034 A | * | 5/1985 | Merchant et al. | 148/551 |
| 5,476,725 A | * | 12/1995 | Papich et al. | 148/523 |
| 6,019,939 A | | 2/2000 | Gray et al. | |
| 6,294,272 B2 | * | 9/2001 | Sontgerath et al. | 420/551 |
| 6,451,453 B1 | * | 9/2002 | Kucza et al. | 148/523 |

FOREIGN PATENT DOCUMENTS

| | | |
|---|---|---|
| EP | 1055898 A2 | 11/2000 |
| EP | 1075935 A1 | 2/2001 |
| JP | 03013550 | 1/1991 |
| JP | 03281761 | 12/1991 |
| JP | 08283922 | 10/1996 |
| JP | 09031613 | 2/1997 |

OTHER PUBLICATIONS

Henry (Hong) S. Yang et al., "Mechanisms of Liquid Film Migration (LFM) in Aluminum Brazing Sheet", Kaiser Aluminum & Chemical Corp., pp. 649658.

* cited by examiner

Primary Examiner—George Wysomierski
(74) Attorney, Agent, or Firm—Connolly Bove Lodge & Hutz LLP

(57) ABSTRACT

The invention relates to a process to manufacture a clad strip, <1.5 mm thick, intended for the manufacture of brazed heat exchangers, comprising:

casting of a plate made of core alloy composed as follows (o by weight):
Si<0.8 Fe<0.8 Cu: 0.2–0.9 Mn: 0.7–1.5 Mg<0.4 Zn<0.2 Ti<0.1 other elements <0.05 each and <0.15 in total, the remainder aluminum, homogenization of said plate between 550 and 630° C. for at least one hour, cladding on one or two sides of said blank of a brazing aluminum alloy, preferentially containing 5 to 13% silicon, hot rolling followed by cold rolling of the plated blank to a thickness close to the final thickness, recrystallization annealing of the strip between 300 and 4000C., strain hardening of the annealed strip to obtain a permanent deformation between 2 and 10% and the final thickness.

7 Claims, 1 Drawing Sheet

ALUMINUM ALLOY STRIP MANUFACTURING PROCESS FOR THE MANUFACTURE OF BRAZED HEAT EXCHANGERS

FIELD OF THE INVENTION

The invention relates to the manufacture of thin strips (of a thickness generally between 0.1 and 1.5 mm) made of aluminum-manganese alloy (3000 series according to the Aluminum Association designations), clad on one or two sides with an aluminum-silicon alloy (4000 series according to the Aluminum Association designations). Said strips are intended to manufacture heat exchanger deep drawn components assembled by brazing, said exchangers being used in particular in engine cooling and automobile body air conditioning systems, and more particularly for air conditioning unit evaporator plates. Brazing techniques for aluminum alloys are described for example in the article by J. C. Kucza, A. Uhry and J. C. Goussain "Le brasage fort de l'aluminium et ses alliages", published in Soudage et Techniques Connexes, November–December 1991, pp. 18–29. The strips according to the invention are used particularly in non-corrosive flux brazing techniques such as NOCOLOK® or CAB (controlled atmosphere brazing), but may also be used in other brazing techniques such as vacuum brazing.

STATE OF THE ART

The use of aluminum alloys in automobile vehicle heat exchangers has developed in recent years, particularly due to the weight gain provided with reference to that of copper alloys. The properties required for the aluminum alloy strips used for the manufacture of brazed exchangers are particularly a good brazing capacity, a high mechanical resistance after brazing, such that the thinnest possible strips can be used, sufficient formability for easy shaping of the components, particularly evaporator plates comprising deep drawn ribs, and finally a good corrosion resistance. Said resistance is generally characterized by the SWAAT (salt water acetic acid test) test according to the standard ASTM G85. Naturally, it is important for the elaboration cost of the strips to be compatible with automobile industry requirements.

The alloy frequently used as the core alloy is 3003, composed as follows (% by weight according to the standard EN 573-3):
Si<0.6 Fe<0.7 Cu: 0.05–0.20 Mn: 1.0–1.5 Zn<0.10 other elements <0.05 each and <0.15 in total, the remainder aluminum. Numerous alloys have been proposed in recent years to improve any of the properties for use mentioned above, more particularly corrosion resistance, hence the term "long-life" sometimes used to refer to said alloys in the related art.

The patent EP 0326337 (Alcan International) describes a clad strip for which the core alloy is composed as follows:
Si<0.15 Fe<0.4 Cu: 0.1–0.6 Mn: 0.7–1.5 Mg<0.8

The low Si content, preferentially <0.05%, enables the formation of a dense layer of Mn precipitates, frequently referred to as a "brown band", which acts as a barrier to the diffusion of silicon in the coating alloy and increases corrosion resistance. WO 94/22633 is a variant of the above which only differs by a higher Cu content (0.6–0.9%). In both cases, the "brown band" can only be obtained in the absence of homogenization before hot rolling or intermediate annealing.

The patent EP 0718072 (Hoogovens Aluminium Walzprodukte) describes a core alloy composed as follows:
Si>0.15 Fe<0.8 Cu: 0.2–2 Mn: 0.7–1.5 Mg: 0.1–0.6 where Cu+Mg<0.7 and with the possible addition of Ti, Cr, Zr or V. The examples show Si contents of 0.5%.

The International patent application WO 99/55925 by the same company relates to an alloy composed as follows:
Mn: 0.7–1.5 Cu: 0.5–1.5 Mg<0.8 Si<0.15 Fe<0.4

In the brazed and aged state, the alloy shows a yield strength $R_{0.2}$>75 MPa and a perforation-free service life in the SWAAT test of at least 13 days.

The French patent application by the applicant No. 99-10536 relates to strips or tubes for brazed exchangers made of alloy composed as follows:
Si: 0.15–0.30 Fe<0.25 Cu: 0.2–1.1 Mn: 1.0–1.4 Mg<0.4 Zn<0.2 Fe<Si and Cu+Mg>0.4

For parts requiring significant shaping, the strips are used in the annealed temper (O temper according to the standard NF EN 515) and in other cases in the cold-rolled temper, for example the H14 or H24 tempers.

PROBLEM STATEMENT

The corrosion resistance of the brazed exchangers, as measured by the SWAAT test, depends not only on the composition of the core alloy or the selected brazing alloy. The phenomenon which practically always seems to cause rapid corrosion of exchangers and particularly of evaporator plates is liquid film migration or LFM. This phenomenon is described, for example, in the article by H. S. Yang and R. A. Woods "Mechanisms of Liquid Film Migration (LEM) in Aluminum Brazing Sheet", VTMS3 Conference Proceedings, SAE International, Indianapolis, 1997, pp. 639–658. This consists of a diffusion process of the silicon from the brazing alloy to the core during brazing, the brazing alloy being either that clad on the core alloy strip or deposited on said strip by any other means, or obtained from the coating of the part adjacent to the brazing. This includes the formation of precipitate-rich grain boundaries, which form paths particularly liable to intergranular corrosion, due to the significant difference in potenetial between the phases present and the aluminum matrix. The presence of dislocations favours this phenomenon. This is one of the reasons, in addition to the improved formability, why an annealed temper is used, which results in a fine-grained recrystallized structure. However, for exchanger plates comprising deformed parts, shaping generates variable strain hardening in the part, and, to obtain a recrystallized microstructure throughout, it would be necessary to anneal the part after shaping, which would increase production costs. This is particularly the case for evaporator plates.

OBJECT OF THE INVENTION

The purpose of the invention is to improve further the corrosion resistance, measured with the SWAAT test, of brazed exchanger deep drawn components made of Al—Mn type aluminum alloys, in particular vehicle air conditioning exchanger evaporator plates, without increasing production costs dramatically.

In this way, the invention relates to a process to manufacture a clad strip, <1.5 mm thick, intended for the manufacture of brazed heat exchanger deep drawn parts, comprising:

casting of a plate made of core alloy composed as follows (% by weight):
Si<0.8 Fe<0.8 Cu: 0.2–0.9 Mn: 0.7–1.5 Mg<0.4 Zn<0.2 Ti<0.1 other elements <0.05 each and <0.15 in total, the remainder aluminum, homogenization of said plate between 550 and 630° C. for at least one hour, cladding on one or two sides of said plate of a brazing aluminum alloy, preferentially containing 5 to 13% silicon, hot rolling followed by cold rolling of the clad plate to a thickness close to the final thickness, recrystallisation annealing of the strip between 300 and 400° C., strain hardening of the annealed strip to obtain a permanent deformation between 2 and 10% and the final thickness.

This final strain hardening may be obtained with "skin pass" type cold rolling or tension levelling.

DESCRIPTION OF THE INVENTION

Figure 1:
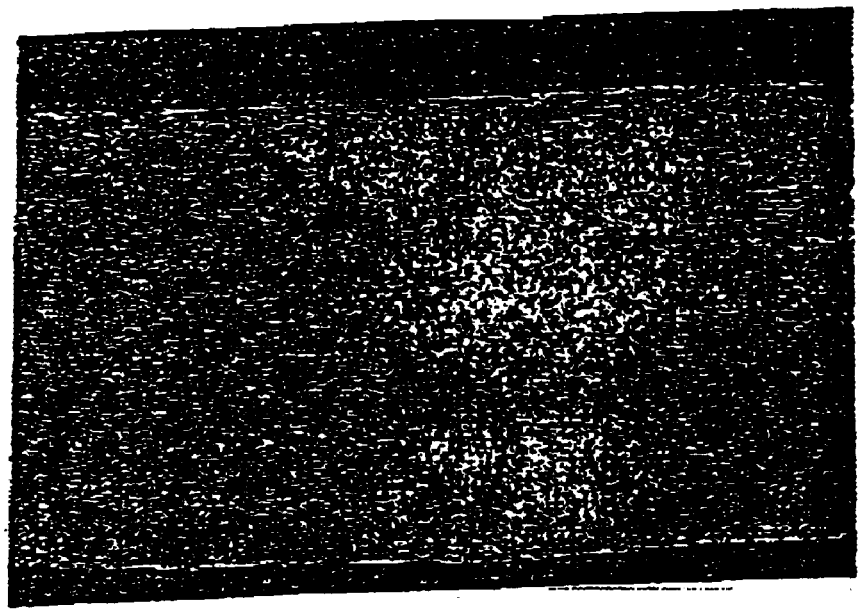
FIG. 1 represents a micrograph of a section of a brazed strip showing liquid film migration.
Figure 2:
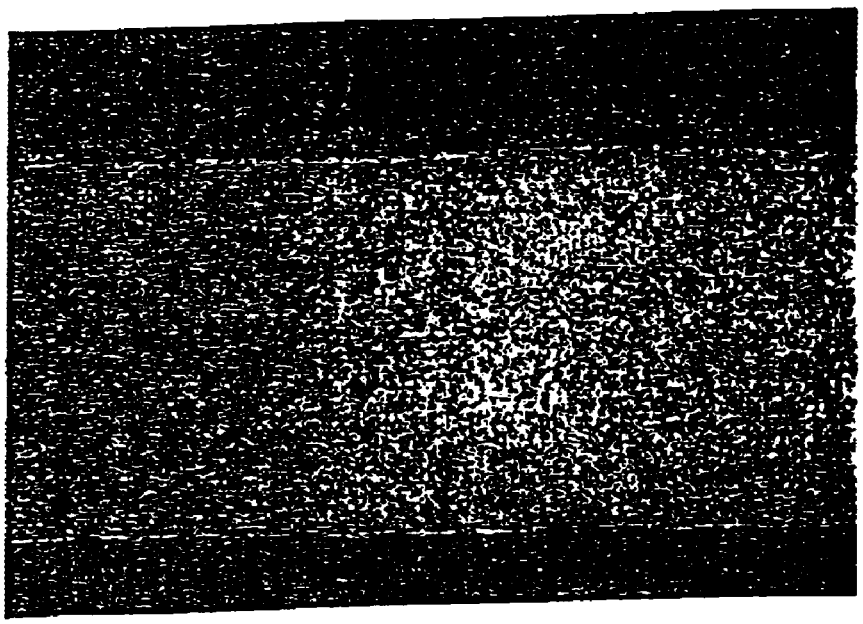
FIG. 2 represents a micrograph of a section of a brazed strip free of this phenomenon.

The invention is based on the following observation made by the applicant: that it is possible to obtain a recrystallized structure, not only in the annealed temper, but also, after brazing, after a certain minimum level of strain hardening, which depends on the shaping of the part and speed of the brazing cycle, particularly the temperature rising rate. However, the H14 or H24 tempers, used for parts with little or no deformation, are not suitable for significantly deformed parts such as evaporator plates, since it is not possible to draw them, particularly in areas requiring significant elongation. To obtain an acceptable level of critical strain hardening, while ensuring good final recrystallization, and therefore an absence of dislocations after brazing, the applicant thought of favouring recrystallization with advanced homogenization before rolling, used to create a homogeneous phase population of a sufficient size to serve as seeds for the recrystallized grains. This process is unlike the prior art in that it does not try to obtain a "brown band" through the absence of homogenization.

The process according to the invention can thus be applied to a wide range of Al—Mn alloys, without being subject to the composition constraints related to obtaining a "brown band". Manganese is within limits close to those of 3003 alloy; it contributes to mechanical resistance and corrosion resistance, increasing the difference in electrochemical potential between the core alloy and the coating layer. As for all Al—Mn alloys, it is hardly possible to reach levels over 1.5%, since the alloy is no longer easy to cast.

It is not necessary to maintain a silicon content under 0.15%, which makes it possible to avoid using a pure base, the cost of which is high. In addition, in alloys containing magnesium, silicon contributes to mechanical resistance by forming $Mg_2Si$ precipitates. A limited iron content is favorable for corrosion resistance and formability, but it is not necessary to drop to very low contents <0.15% which would result in high cost prices.

Copper is a hardening element which contributes to mechanical resistance, but above 1% coarse intermetallic compounds may be formed during casting which have an adverse effect on the homogeneity of the metal and form corrosion initiation sites.

Magnesium has a favorable effect on mechanical resistance. However, it has an adverse effect on brazing ability, in that it migrates to the coating surface and, for brazing other than vacuum brazing, it forms an oxide layer which modifies the brazing properties and brazing flux action mechanism unfavorably. For this reason, its content must be limited to 0.4%. For very demanding applications in relation to joint quality, it may be necessary to eliminate magnesium completely. In this case, it is preferable to have at least 0.4% copper to compensate for the loss of mechanical resistance, for example maintaining a sum of the Cu+Mg contents >0.4%.

A limited addition of zinc may have a beneficial effect on corrosion resistance, by modifying the electrochemical mechanisms, particularly for alloys with the highest copper concentrations. However, it must remain below 0.2% to avoid an excessively high susceptibility to generalized corrosion. Titanium, at a content less than 0.01%, is known to have a favorable influence on corrosion resistance.

Given that it is needed to favor recrystallization of the alloy as much as possible, it is necessary to limit the content of anti-recrystallizing elements, such as chromium, vanadium, hafnium and scandium, by keeping their maximum content below 0.01% for example.

When clad strips are used, the brazing alloy must have a sufficiently low liquidus temperature with reference to the core alloy to obtain a sufficient temperature interval for brazing, an acceptable mechanical resistance and a good wettability. Preferentially, it consists of an AlSi alloy containing between 5 and 13% silicon, such as 4004, 4104, 4045, 4047 or 4343 alloys, and may contain other added elements, for example zinc and/or strontium. It is also possible to use multilayer coating with other alloys in addition to the AlSi layer. The thickness of the coating layer may vary between 0.01 and 0.2 mm and most frequently represents approximately 10% of the total thickness.

The strip manufacturing process comprises casting of a core alloy plate and of one or more brazing alloy plates, according to whether one or two-sided cladding is required. The core alloy plate is subjected to advanced homogenization between 550 and 630° C. for at least 1 hour, and preferentially for over 3 hours. The clad assembly is then produced, and is hot rolled, preferentially at a sufficiently high outlet temperature to limit manganese reprecipitation as much as possible, and then cold rolled to a thickness close to the final thickness, the difference with the final thickness being equivalent to the slight reduction in thickness induced by the subsequent strain hardening operation. Annealing is then performed at a temperature between 300 and 400° C., which results in the recrystallization of the alloy and a fine-grained microstructure.

The strip is then subjected to strain hardening with the permanent deformation rate between 2 and 10%, preferentially between 4 and 8%. Said strain hardening may be obtained for example by low reduction rolling using "skin pass" type rollers or strip tension levelling.

The strips according to the invention are particularly suited to the manufacture of evaporator plates for automobile air conditioning systems. They do not represent a problem for deep drawing, and the brazed assemblies produced from said strips show a perforation-free service life in the SWAAT test of at least 40 days, i.e. at least 10 days more than the best products according to the prior art. Microstructural studies performed on brazed parts showed a completely recrystallized structure in all areas, and an absence of LFM.

EXAMPLES

Example 1

Manufacturing Schedule Without Final Strain Hardening

A plate of core alloy composed as follows (% by weight) was cast:

Si=0.19 Fe=0.19 Cu=0.62 Mn=1.33 Mg=0.001 Cr=0.002 Zn=0.039 Ti=0.09 remainder aluminum.

The plate was homogenized for 10 hours at 600° C. and then cooled. After scalping the plate, a 4343 alloy sheet composed as follows, Si=7.21 Fe=0.25 Mn=0.08 remainder aluminum, was welded on both sides. The unit was heated to 500° C. and then cold rolled at 500° C. to a thickness of 3 mm, and finally cold rolled up to 0.52 mm. The strip obtained was subjected to annealing for 30 min at 350° C.

In the annealed strip, blanks were cut to form, by deep drawing, evaporator plate type test specimens of an automobile body air conditioning unit. The test specimens were coated with a Nocolock® type non-corrosive brazing flux and then pre-assembled together by means of a stainless steel assembly. The specimens were brazed in a furnace in nitrogen at 600° C. for 2 min and the brazed assembly was air-cooled.

At numerous points, the microstructure after brazing shows coarse grains, delimited by large intermetallic particles, but practically free of precipitates inside. This microstructure is characteristic of the LFM phenomenon.

SWAAT test corrosion tests according to the standard ASTM G85 result in a perforation of the brazed assembly after 34 days. In the absence of homogenization of the cast core metal plate, perforation is more rapid and takes place after 24 days.

Example 2

3% Final Strain Hardening

The same operations as in Example 1 are reproduced, except that the cold rolling of the clad strip is stopped at 0.536 mm. After annealing, the strip is stretched using a tension leveller resulting in a permanent elongation of the order of 3% and reducing the thickness to 0.52 mm.

The microstructure after deep drawing of the plates and brazing shows a recrystallized structure almost throughout, except in the least deformed regions which may, in some cases, still be subject to a slight LFM phenomenon.

SWAAT test corrosion tests result in preferential corrosion of the brazed joints with no perforation after 45 days. If the cast core metal plate has not undergone homogenization, perforation takes place after 28 days.

Example 3

6% Final Strain Hardening

The same operations as in Example 1 are reproduced, except that the cold rolling of the plated strip is stopped at 0.552 mm. After annealing, the strip is stretched using a tension leveller resulting in a permanent elongation of the order of 6% and reducing the thickness to 0.52 mm.

The microstructure after brazing shows a recrystallized structure throughout, irrespective of the deformation and a total absence of LFM.

SWAAT test corrosion tests result in a preferential corrosion of the brazed joints with no perforation after 45 days. The corrosion face on the core metal is more or less lateral with no localized pitting.

The priority document, French patent application number 0014791, filed Nov. 16, 2000, is incorporated herein by reference in its entirety including the title, abstract, specification, claims, and figures.

What is claimed is:

1. A process to manufacture a clad strip, <1.5 mm thick, suitable for use in the manufacture of brazed heat exchangers, comprising:
   casting of a plate made of core alloy comprising (% by weight):
     Si<0.8 Fe<0.8 Cu: 0.2–0.9 Mn: 0.7–1.5 Mg<0.4 Zn<0.2 Ti<0.1 other elements<0.05 each and <0.15 in total, the remainder aluminum, and wherein the core alloy contains less than about 0.01% of Cr, Zr, Hf, V or Sc,
   homogenization of said plate between 550 and 630° C. for at least one hour,
   cladding on one or two sides of said plate of a brazing aluminum alloy,
   hot rolling followed by cold rolling of the plate to a thickness close to the final thickness,
   recrystallization annealing of the strip between 300 and 400° C.,
   strain hardening of the annealed strip to obtain a permanent deformation between 2 and 10% of the final thickness.

2. A process according to claim 1, wherein the brazing alloy comprises 5 to 13% silicon.

3. A process according to claim 1, wherein the homogenization time is greater than 3 hours.

4. A process according to claim 1, wherein the strain hardening of the annealed strip is performed with a permanent deformation between 4 and 8%.

5. A process according to claim 1, wherein the strain hardening of the annealed strip is performed by skin-pass type rolling.

6. A process according to claim 1, wherein the strain hardening of the annealed strip is performed by tension levelling.

7. A process according to claim 1, wherein said clad strip possesses a final recrystallized structure in order to avoid dislocations after brazing.

* * * * *